United States Patent
Stevens

(10) Patent No.: US 7,380,742 B2
(45) Date of Patent: Jun. 3, 2008

(54) LEVEL WIND WINCH CABLE TENSIONER

(75) Inventor: Daniel Winfred Stevens, 2026 North Wahsatch, Colorado Springs, CO (US) 80907

(73) Assignee: Daniel Winfred Stevens, Colorado Springs, CO (US)

(*) Notice: Subject to any disclaimer, the term of this patent is extended or adjusted under 35 U.S.C. 154(b) by 151 days.

(21) Appl. No.: 10/999,678

(22) Filed: Nov. 30, 2004

(65) Prior Publication Data

US 2005/0116079 A1 Jun. 2, 2005

Related U.S. Application Data

(60) Provisional application No. 60/526,337, filed on Dec. 2, 2003.

(51) Int. Cl.
*B65H 27/00* (2006.01)
(52) U.S. Cl. .............................. 242/397.3; 242/157.1; 254/385
(58) Field of Classification Search .............. 242/397.3, 242/397, 615.3, 157.1, 419.4, 419.5; 254/335, 254/336, 385
See application file for complete search history.

(56) References Cited

U.S. PATENT DOCUMENTS

| 486,538 | A | | 11/1892 | Phleegar |
|---|---|---|---|---|
| 489,742 | A | | 1/1893 | Hoffstaedt |
| 2,656,125 | A | * | 10/1953 | O'Dell ...................... 242/419.2 |
| 2,660,382 | A | * | 11/1953 | Wilson ...................... 242/478.2 |
| 2,888,216 | A | * | 5/1959 | Simons, Jr. et al. ....... 242/419.1 |
| 3,121,538 | A | * | 2/1964 | Klingensmith et al. ....... 242/444 |
| 3,671,016 | A | | 6/1972 | Gladysz |
| 3,876,183 | A | | 4/1975 | Strout et al. |
| 4,045,001 | A | | 8/1977 | Harvey, Jr. |
| 4,515,327 | A | | 5/1985 | Ashley |
| 4,540,017 | A | | 9/1985 | Prange |
| 4,777,976 | A | | 10/1988 | Johnston et al. |
| 4,778,121 | A | | 10/1988 | Minnee |
| 4,892,262 | A | | 1/1990 | Hurst |
| 5,002,238 | A | | 3/1991 | Inhofer et al. |
| 5,009,353 | A | | 4/1991 | Alquist |
| 5,050,816 | A | * | 9/1991 | Niederer ...................... 242/149 |
| 5,385,314 | A | * | 1/1995 | Hughes ...................... 242/397.3 |
| 5,758,685 | A | | 6/1998 | Tisbo et al. |
| 5,865,392 | A | | 2/1999 | Blount et al. |
| 6,811,112 | B1 | * | 11/2004 | Currie et al. ............. 242/534.1 |

FOREIGN PATENT DOCUMENTS

JP  06072640 A * 3/1994

* cited by examiner

*Primary Examiner*—Peter M. Cuomo
*Assistant Examiner*—Sang Kim
(74) *Attorney, Agent, or Firm*—Dale B. Halling

(57) ABSTRACT

A winch cable storage device includes a cable-tensioning mechanism for attachment to a cable winch. The manual cable tensioner is removably attached to the cable winch and includes a level wind feature. The level winder includes a flexible frame attached between the cable winch and the cable-tensioning mechanism. The cable-tensioner includes a clamp housing and a pair of opposed, spring-loaded friction pads.

13 Claims, 5 Drawing Sheets

LEVEL WIND WINCH CABLE TENSIONER

PRIORITY DATA

This application claims benefit of U.S. Provisional Patent Application Ser. No. 60/526,337 filed on Dec. 2, 2003.

BACKGROUND OF THE INVENTION

1. Field of the Invention

The present invention relates to level wind mechanisms for cable winches. In particular, the present invention relates to a cable tensioning and level wind mechanism for properly storing wire or nylon winch cables.

2. Description of the Related Art

Cable winches are a common part of our automotive culture. Off-road vehicles, recovery vehicles and tow trucks use cable winches regularly. Use of cable winches has become commonplace, but proper usage and cable storage procedures are less well known. Any kinks, binding or uneven winding can damage or seriously weaken the cable. Proper storage techniques must be followed to avoid damaging the cable. To maximize the life of a cable, the cable must be wound on the drum tightly. There must be no space between windings. Each layer must be completed before the next layer is started. Any space between windings may permit the overriding layer to fall down to the lower layer and become jammed or wedged between the lower windings. A cable jammed in such a manner is easily frayed, kinked and damaged.

Numerous devices have been developed to simplify the use of cable winches. These devices include various level-wind mechanisms to distribute winch cables evenly. However, these devices are needlessly complex and incapable of being retrofitted to existing cable winches. Some of these devices have bars or plates that ride against the cable and the cable drum to hold the cable down against the drum, to prevent the cable from coming loose. These bars or plates are biased against the drum with springs or similar mechanisms. The bars and plates do hold the cable against the drum, but they do not ensure that the cable is wound evenly and tightly on the drum.

Up until now, the choices of procedures for properly winding and tensioning a cable were quite limited. First, the cable is unwound from the winch. The end of the cable is secured to an immovable object, such as a utility pole, large rock or tree. The vehicle to which the winch is attached is backed away from the cable anchor point to place some tension on the cable. Next, the vehicle's brakes are applied to permit the vehicle to roll, but only if pulled or pushed with some effort. This is to ensure that tension is applied to the cable as it is wound onto the winch. Finally, the winch is turned on to wind the cable onto the winch drum against the resistance of the vehicle's brakes. The cable will have the proper tension as it is wound onto the winch, but this procedure alone will not evenly wind the cable onto the winch.

If the user wants to level wind the cable onto the winch, he must steer the vehicle slowly from side to side as the winch winds the cable. Generally this also requires a second person to guide the cable by hand.

Therefore, there has been and continues to be a need for a simple, rugged level wind apparatus for a winch cable that is easy for one person to use and effectively and properly winds cables for storage on a cable drum.

SUMMARY OF THE DISCLOSURE

The present invention provides a winch cable storage device. The device includes a cable-tensioning mechanism that is attached to a cable winch. The cable tension mechanism is removably attached to the cable winch and includes a level wind feature. The level wind feature includes a flexible frame attached between the cable winch and the cable-tensioner. The level wind feature is operated manually or automatically. The cable-tensioner includes a clamp housing and a pair of opposed, spring-loaded friction pads. Alternatively, the friction pads may be a pair of friction rollers having a circumferential groove. A plurality of internal or external brake pads retard the motion of the friction rollers to apply tension to the cable. The automatic level wind feature includes a driveshaft attached to the cable tensioner and in rotational communication with the friction rollers or the cable drum. The driveshaft includes a continuous, double helical groove, and a shuttle is attached to the driveshaft and is in engagement with the groove. The shuttle includes a cable guide. The double helical groove is indexed to the diameter of the cable and the width of the cable drum to ensure the cable is wound onto the drum evenly and tightly.

DETAILED DESCRIPTION OF THE DRAWINGS

The following detailed description is of the best presently contemplated modes of carrying out the invention. This description is not to be taken in a limiting sense, but is made merely for the purpose of illustrating general principles of embodiments of the invention.

The present invention provides a winch cable storage device. The device includes a cable-tensioning mechanism for attachment to a cable winch. The cable tension mechanism is removably attached to the cable winch and includes a level wind feature. The level wind feature includes a flexible frame attached between the cable winch and the cable-tensioning mechanism. The level wind feature is operated manually or automatically. The manual cable-tensioner includes a tension housing and a pair of opposed, spring-loaded friction pads. The pair of friction pads may be a pair of friction rollers having a circumferential groove. A plurality of internal or external brake pads retards the motion of the friction rollers. The automatic level wind feature includes a driveshaft attached to the cable tensioner. The driveshaft is in rotational communication with the friction rollers or the cable drum. The driveshaft has a continuous, double helical groove and a shuttle attached to the driveshaft and in engagement with the groove. The shuttle includes a cable guide. The double helical groove is indexed to the diameter of the cable and the width of the cable drum to ensure the cable is wound onto the drum evenly and tightly.

Figure 1:
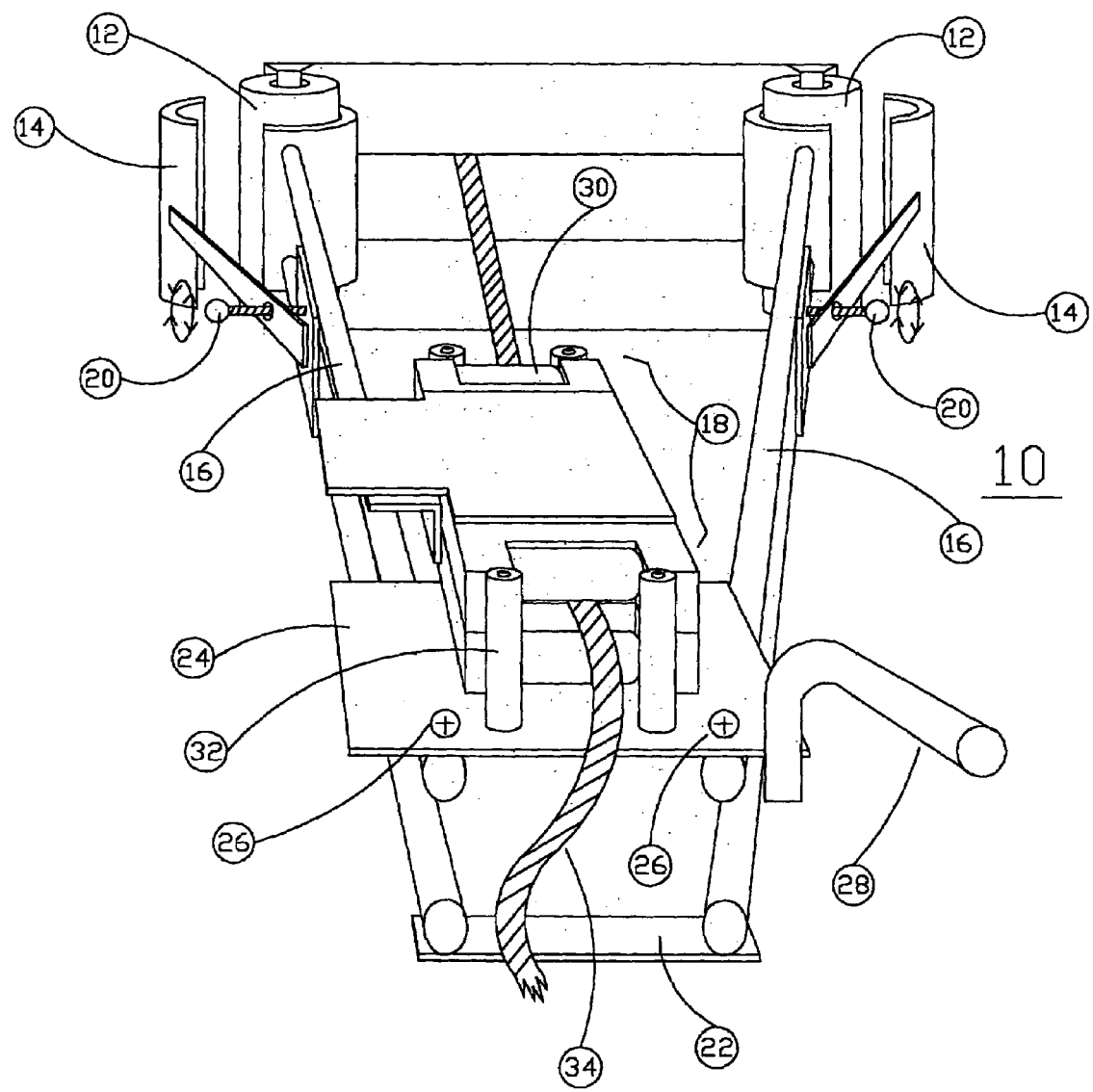
FIG. 1 is a perspective view of an embodiment of the winch cable storage device in accordance with the present invention.

FIG. 1 shows a winch cable storage device 10 attached to the roller fairlead on a cable winch. The winch cable storage device 10 is clamped to the fairlead rollers 12 of the cable winch. FIG. 1 shows the winch cable storage device 10 clamped to the vertical rollers of the roller fairlead with a pair of clamps 14. The clamps 14 are split cylindrical tubes that are opened to fit around the fairlead rollers 12. If desired, spacers may be used to compensate for various sizes of fairlead rollers 12. The horizontal rollers may also be used, depending on the specific application and the needs of the user. A pair of support arms 16 are attached to the clamps 14 to provide support for the cable tensioning mechanism 18. Each support arm 16 is split near the clamps 14 to enable to clamps 14 to open enough to attach around the fairlead roller 12. The clamps 14 may be secured via a thumbwheel 20 or similar fastener, that draws the clamps 14 closed tightly around the fairlead rollers 12. Opposite the clamps 14, the support arms 16 terminate with, and are joined by, a crossbar 22. The crossbar 22 is pivotally attached to the support arms 16. The crossbar 22 and the support arms 16 form the basic flexible frame for the level wind mechanism. A base plate 24 is attached at two pivot points 26 across the support arms 16. A handle 28 is attached to one of the support arms 16 to permit manual movement of the winch cable storage device 10. The geometry of the support arms 16, the pivots points 26 and the crossbar 22 permit the flexible frame assembly to travel a limited distance in a horizontal plane, side to side. Where the winch cable storage device 10 is clamped to the horizontal rollers of the roller fairlead, the motion of the flexible frame would be vertical.

The cable tensioning mechanism 18 includes a cable tensioner 18 and a plurality of horizontal guide rollers 30 and vertical guide rollers 32 to guide the cable 34 through the cable tensioner 18. Any combination of guide rollers 30, 32 may be used, either vertical, horizontal, or both, as shown.

Figure 2:
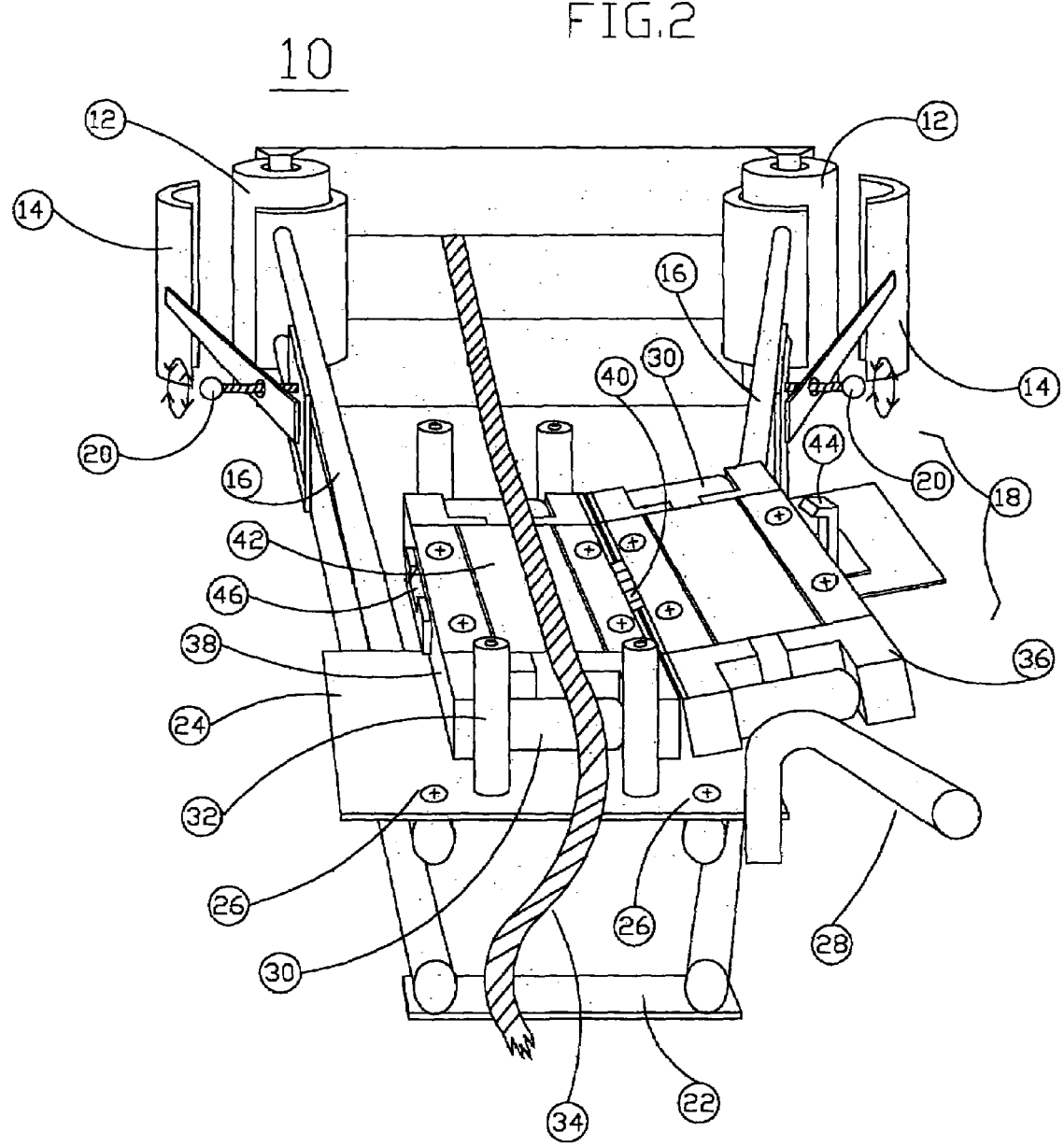
FIG. 2 is a perspective view of an embodiment of the winch cable storage device in accordance with the present invention.

FIG. 2 shows a winch cable storage device 10 attached to a cable winch, with the tension mechanism 18 opened. The tension mechanism 18 has an upper plate 36 and a lower plate 38 connected by a hinge 40. A pair of spring-loaded friction pads 42 are centered in the upper and lower plates 36, 38. The friction pads 42 extend for along the length of the upper and lower plates 36, 38 between the guide rollers 30, 32. The friction pads 42 are made from a material that will not damage the cable 34, even through protracted use. Suitable materials include brass and other soft metals, and hard plastics, such as Delrin® or other bearing-grade plastics or rubber or wood or ceramics etc. The friction pads 42 may include a groove to provide maximum surface area against the cable 34, and maximum control of the cable 34. The friction pads 42 are replaceable when they are worn. A latch 44 and a catch 46 hold the upper and lower plates 36, 38 closed and in contact with the cable 34. The latch 44 is spring-loaded and concealed beneath a latch shroud 48 (See FIG. 3). The latch shroud 48 provides additional leverage for closing the upper and lower plates 36, 38 together on the cable 34, and against the spring tension of the friction pads 42.

Figure 3:
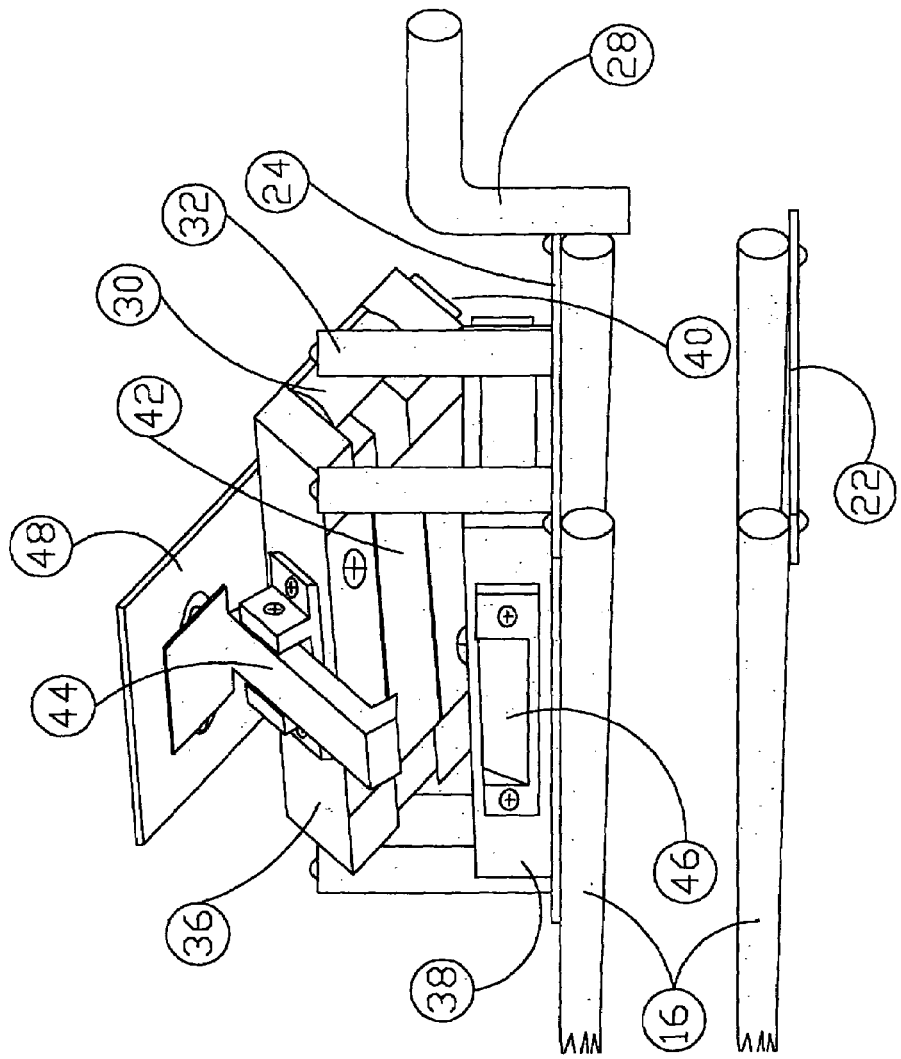
FIG. 3 is a perspective view of the clamp housing for the winch cable storage device in accordance with the present invention.

FIG. 3 is a perspective view of the cable tensioner 18 for the winch cable storage device in accordance with the present invention. The relationship between the guide rollers 30, 32 and the upper and lower plates 36, 38 keeps the cable 34 properly oriented. One horizontal guide roller 30 is at each end of both the upper and lower plates 36, 38. A pair of vertical guide rollers 32 are mounted to the base plate 24 adjacent to each end of the lower plate 38. When the upper plate 36 is latched down onto the lower plate 38, the guide rollers 30, 32 form a narrow pathway for the cable 34 to pass through. The narrow pathway keeps the cable centered on the friction pads 42. This pathway also provides more precise level winding of the cable 34 on the drum.

Figure 4:
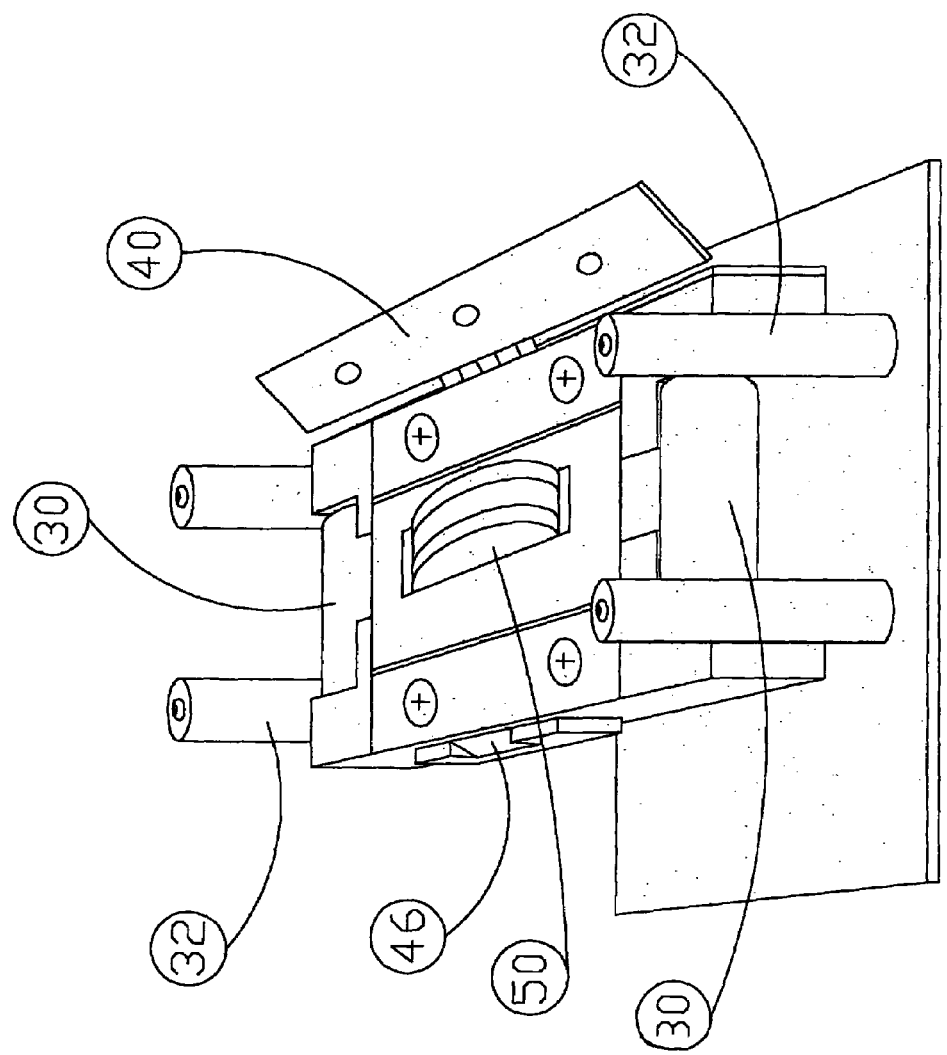
FIG. 4 is a perspective view of the clamp housing for the winch cable storage device, in accordance with the invention.

FIG. 4 is a perspective view of the cable tensioner 18 for the winch cable storage device, in accordance with the invention. For clarity, the upper plate 36 is removed from the hinge 40 and is not shown. FIG. 4 is an alternative embodiment of the cable tensioner 18. In this embodiment, the friction pads 42 are replaced with a pair of friction rollers 50. One friction roller 50 is set into an aperture in the upper and lower plates 36, 38. Like the friction pads 42 of FIGS. 1-3, the friction rollers 50 are spring-loaded to press against the cable 34. The friction roller 50 further include a brake mechanism (not shown) that resists the rotation of the friction rollers 50. The brake bears against the sides of the rollers 50 or against their axles for the rollers 50. The friction rollers 50 have a circumferential groove that closely matches the diameter of the cable 34. When the pair of friction rollers 50 are clamped together around the cable 34, the friction rollers 50 grip tightly to the cable 34 without damaging or excessively distorting the cable 34.

Figure 5:
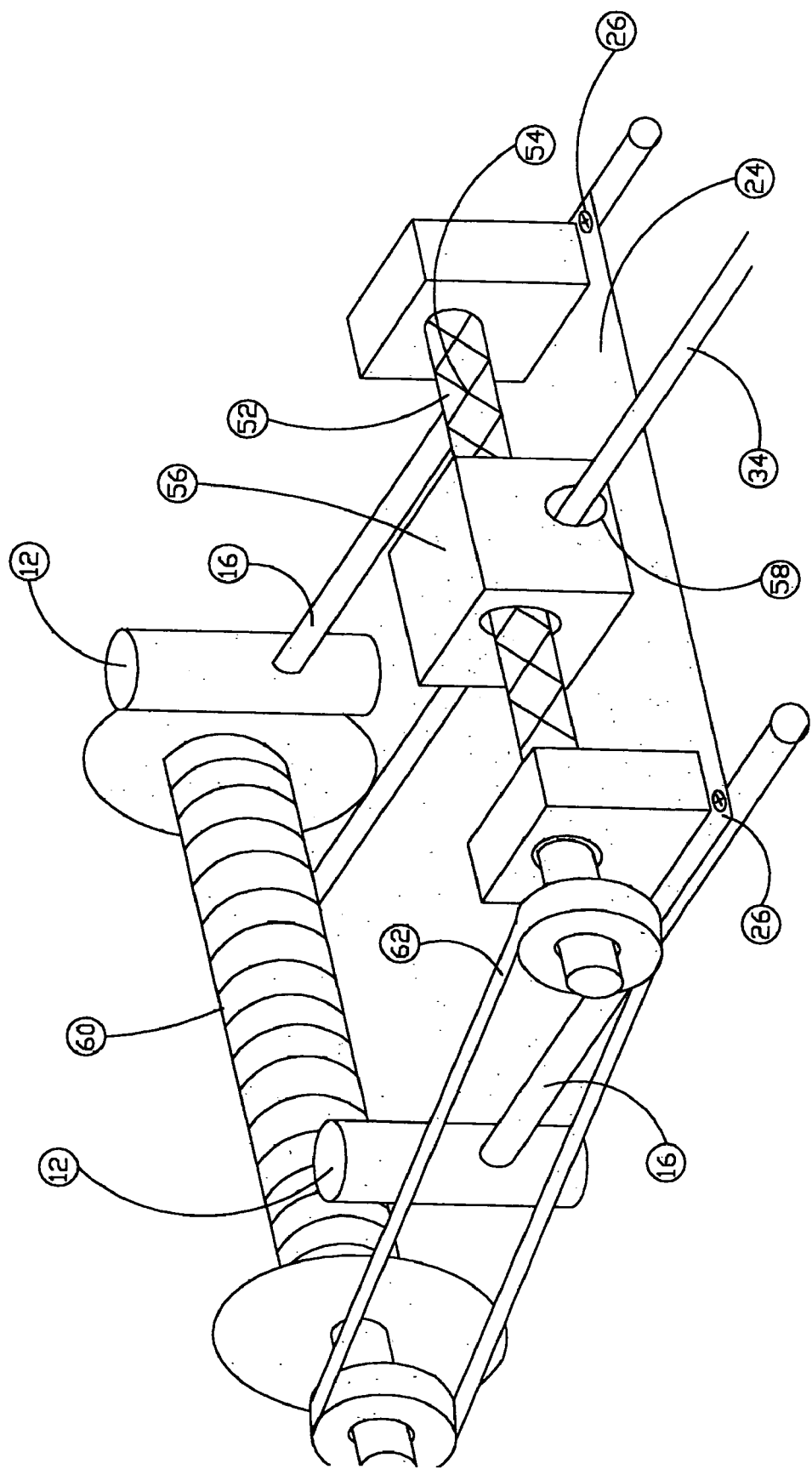
FIG. 5 is a perspective view of the automatic level winding mechanism for the winch cable storage device, in accordance with the invention.

FIG. 5 is a perspective view of the automatic level winding mechanism for the winch cable storage device, in accordance with the invention. A driveshaft 52 is mounted between the cable tensioner (not shown) and the fairlead rollers 12 on the winch. The driveshaft 52 has a continuous, double helical groove 54 for driving a shuttle 56. The shuttle includes a cable guide 58. The driveshaft 52 is in rotational communication with a drive roller on the cable tensioner (not shown). Alternatively, the driveshaft 52 receives rotational power from the cable drum 60. As the driveshaft 52 turns, the shuttle 56 moves continuously, from one end of the driveshaft 52 to the other. The rate of travel for the shuttle 56 is directly proportional to the speed of the drive roller or cable drum 60. The groove 54 may be indexed to match the width of the cable drum 60 and the diameter of the cable 34.

The use of the device is quite straightforward. After using the cable 34, the clamps 14 of the device are opened and secured around the fairlead rollers 12 of the winch. Next, the cable tensioner 18 is opened and the cable 34 is routed through the guide rollers 30, 32 and across the friction pads 42 or friction rollers 50. The upper plate 36 is then latched onto the lower plate 38.

Finally, the user activates the winch motor. The cable 34 is properly tensioned as it is wound onto the winch. The user guides the handle 28 from side to side to place successive windings in direct contact with each other. As one layer of cable 34 is finished, the next layer is started in the opposite direction until all of the cable 34 is wound onto the winch.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A winch cable storage device, comprising a cable-tensioning mechanism for attachment to a winch, wherein the cable tensioning mechanism is removably attached to the winch with a plurality of clamps, wherein the cable-tensioning mechanism includes a level wind feature having a handle.

2. The winch cable storage device as set forth in claim 1, where the level wind feature comprises a flexible frame attached between the cable winch and the cable-tensioning mechanism.

3. The winch cable storage device as set forth in claim 1, where the cable-tensioning mechanism comprises:
   a clamp housing; and
   a pair of opposed friction pads inside the clamp housing.

4. The winch cable storage device as set forth in claim 3, where the friction pads are spring-loaded.

5. The winch cable storage device as set forth in claim 1, wherein the cable-tensioning mechanism includes a pair of friction rollers.

6. The winch cable storage device as set forth in claim 5, where each of the friction rollers has a circumferential groove.

7. The winch cable storage device as set forth in claim 1, where the level wind feature includes an automatic level wind mechanism attached between the cable tensioning mechanism and the winch.

8. The winch cable storage device as set forth in claim 7, where the level wind feature comprises:
   a driveshaft attached to the cable tensioning mechanism and in rotational communication with at least one drive roller within the cable tensioning mechanism, where the driveshaft has a continuous, double helical groove; and
   a shuttle attached to the driveshaft and in engagement with the groove, the shuttle having a cable guide.

9. The winch cable storage device as set forth in claim 8, where the double helical groove is indexed to the diameter of the cable and the width of the cable drum.

10. A portable, single-operator winch cable level winder comprising a cable tensioner for removable attachment to a winch, wherein the level wind feature comprises a flexible frame attached between the winch and the cable-tensioner and the flexible frame includes a handle for manual level winding.

11. The winch cable storage device as set forth in claim 10, where the cable-tensioner comprises:
    a clamp housing; and
    a pair of opposed friction pads inside the clamp housing.

12. The winch cable storage device as set forth in claim 10, where the device further includes an automatic level winder attached between the cable tensioner and the winch.

13. The winch cable storage device as set forth in claim 12, where the automatic level winder comprises:
    a driveshaft attached to the cable tensioning mechanism and in rotational communication with at least one drive roller within the cable tensioning mechanism, where the driveshaft has a continuous, double helical groove; and
    a shuttle attached to the driveshaft and in engagement with the groove, the shuttle having a cable guide.

* * * * *